United States Patent Office 3,770,847
Patented Nov. 6, 1973

3,770,847
CURABLE ORGANOPOLYSILOXANES
Guenther Fritz Lengnick, Adrian, and Eugene Ray Martin, Onsted, Mich., assignors to Stauffer Chemical Company
No Drawing. Filed Dec. 30, 1971, Ser. No. 214,377
Int. Cl. C08f 35/02
U.S. Cl. 260—827       7 Claims

ABSTRACT OF THE DISCLOSURE

Curable organopolysiloxane compositions and a method for curing the same by incorporating therein hydroxylamines and a cross-linking agent.

---

This invention relates to curable organopolysiloxane compositions and more particularly to two-component curable organopolysiloxane compositions.

Heretofore, various catalysts have been incorporated in organopolysiloxane compositions to accelerate curing thereof. Organometallic compounds, such as dibutyltin butoxychloride, dibutyltin dilaurate, tin butyrate, tin octoate, tin stearate, tin naphthenate, lead octoate, and zinc octoate, have been employed as curing catalysts; however, it was found these catalysts either do not provide a desirable rate of cure or do not cure thick sections of silicone rubber uniformly.

In addition, in a one-component system the silicone rubber is exposed to atmospheric moisture and/or additional water vapor in order to perfect a satisfactory cure. In many of the individual applications, this is extremely difficult if not impossible, thus necessitating a composition which is curable in the absence of moisture.

It is therefore an object of this invention to provide a curable organopolysiloxane composition. Another object of this invention is to provide an organopolysiloxane composition which is curable in the absence of atmospheric moisture. Still another object of this invention is to provide a catalyst for curing a two-component system. A further object of this invention is to provide a method for curing organopolysiloxane compositions.

The foregoing objects and others which will become apparent from the following description are accomplished in accordance with this invention, generally speaking, by incorporating in an organopolysiloxane composition a hydroxylamine catalyst of the formula:

wherein R and R', which may be the same or different are hydrocarbon groups, e.g., alkyl groups having from 1 to 12 carbon atoms and aryl groups having from 6 to 12 carbon atoms.

Examples of hydroxylamines embraced by the above formula are: dimethylhydroxylamine, diethylhydroxylamine, dibutylhydroxylamine, dioctylhydroxylamine, didodecylhydroxylamine, diphenylhydroxylamine, methylethylhydroxylamine, methylpropylhydroxylamine, butylethylhydroxylamine, methylphenylhydroxylamine, and the like.

In the two-component system, the hydroxylamines are incorporated in a composition comprising a cross-linking agent and an organopolysiloxane, preferably a hydroxyl-terminated organopolysiloxane having the formula:

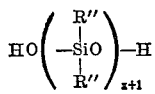

or a modified organopolyqsiloxane having the formula:

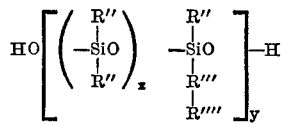

wherein R", which may be the same or different, represents monovalent hydrocarbon radicals, halogenated monovalent hydrocarbon radicals, or cyanoalkyl radicals; R''' is a divalent hydrocarbon radical; R'''' is a polymeric organic group linked to R''' by a carbon-to-carbon linkage; $x$ is an integer of from 0 to 20,000; and $y$ is an integer of from 1 to 500.

In the above formula, R" is an organic group selected from the class consisting of alkyl radicals having from 1 to 8 carbon atoms, such as methyl, ethyl, butyl, hexyl, octyl; aryl radicals, such as phenyl, diphenyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl, and the like. R''' is a divalent hydrocarbon radical having from 1 to 6 carbon atoms, such as ethylene, trimethylene, tetramethylene, hexamethylene, and the like. R'''' is a polymer or copolymer linked to the organopolysiloxane through a carbon-to-carbon linkage with a divalent hydrocarbon radical represented by R''' above.

Hydroxyl terminated diorganopolysiloxane fluids which can be used in the compositions of this invention are comprised of essentially linear polymeric chains which have hydroxyl groups bonded to each of the terminal silicon atoms of each chain. These organopolysiloxane fluids are further characterized by viscosities at 25° C. of from about 100 centipoises up to about 2,000,000 centipoises and preferably in the range of from about 1,000 to 50,000 cps. For the most part, such organopolysiloxanes will vary from pourable liquids to viscous fluids which will slowly flow when poured. Such organopolysiloxanes are further characterized by an organic group to silicon atom ratio of from about 1.9:1 to 2:1 and contain one hydroxyl group bonded to each of the terminal silicon atoms of the polymer chains.

The modified organopolysiloxanes consist of silicone polymers having attached thereto one or more side chains or branches consisting of a carbon-chain polymer. In preparing these compounds, hydrogen is abstracted from the silicone polymer by a free-radical initiator to form an active site for grafting the organic polymer thereto.

The term "modified organopolysiloxane" is meant to include combinations of an organopolysiloxane (silicone) polymer with an organic polymer in which part or all of the organic polymer is connected to the silicone polymer by a carbon-to-carbon linkage.

Any silicone polymer may be used in this invention since these polymers are apparently capable of producing some free radicals or active sites under the proper conditions. Thus, the silicone polymer should be one which is capable of producing a substantial and recognizable number of free radicals, and it should be substantially free of any tendency to undergo further polymerization under the conditions employed. Preferably, the silicone polymer has lower alkyl radicals attached to the silicone atoms since these are more amenable to hydrogen abstraction than other radicals.

Examples of suitable silicone polymers and copolymers which may be used in the formation of grafted organopolysiloxanes are hydroxyl-terminated siloxane fluids, such as, dimethyl fluids, methyl phenyl fluids, copolymers of dimethylsiloxane, and phenyl-, methyl-, or diphenylsiloxane units.

In addition, the silicone polymer may be in the form of partially hydrolyzed silanes containing residual hydrolyzable or condensable groups, such as silanols, salts of silanols, and partially condensed polysiloxanes.

Any polymerizable organic monomer having aliphatic olefinic bonds may be grafted to the silicone polymer. Examples of suitable olefinic compounds are low molecular weight straight-chain hydrocarbons, such as ethylene, propylene, butylene; vinyl halides, such as vinyl chloride and vinyl fluoride; vinyl esters of organic acids, such as vinyl acetate; styrene, ring-substituted styrenes, and other vinyl aromatics, such as vinylpyridine and vinylnaphthalene; acrylic acid and derivatives of acrylic acid, including the salts, esters, amides, and acrylonitrile; N-vinyl compounds, such as N-vinylcarbazole, N-vinylpyrrolidone, and N-vinylcaprolactam; and vinyl silicon compounds, such as vinyltriethoxysilane.

Disubstituted ethylenes of the type $CH_2=CX_2$ may be used, including vinylidene fluoride, vinylidene chloride, vinylidene cyanide, methacrylic acid, and compounds derived therefrom, such as the salts, esters, and amides, as well as methacrolein, methacrolein, methacrylonitrile, and the like.

Examples of disubstituted ethylenes of the type

such as vinylene carbonate and various monomers which polymerize best in the presence of other monomers, e.g., maleic anhydride, esters of maleic and fumaric acids, stilbene, indene, and coumarone, may be used in the formation of these graft polymers.

The monomers may be used singly or in combination of two or three or even more. The properties of the modified product, of course, depend on the nature and identity of the monomer material, as well as on the amounts used relative to the organopolysiloxanes.

The grafting operation is most expeditiously effected by using a free-radical initiator, normally organic peroxides, although other free-radical initiators, such as azo-compounds, in which both the N atoms of the azo linkage are attached to a tertiary carbon atom and the remaining valences of the tertiary carbon atom are satisfied by nitrile, carboxylalkyl, cycloalkylene, or alkyl radicals, preferably having from 1 to 18 carbon atoms. In addition to the above mentioned initiators, ionizing radiation may also be used to bring about the formation of free radicals.

Examples of suitable peroxides which are operative in this invention are hydroperoxides, such as t-butyl hydroperoxide, cumene hydroperoxide, Decalin hydroperoxide; dialkyl peroxides, such as t-butyl perbenzoate, t-butyl peroxyisopropylcarbonate, and t-butyl peroctoate, ketone peroxides, such as acetone peroxide and cyclohexanone peroxide, are also applicable.

The amount of free-radical initiator employed is not critical, thus any amount capable of producing a perceptible degree of grafting is suitable. Generally, as little as 0.05 percent of the more active peroxide initiators based on the weight of the monomer is adequate in most cases. However, where it is desirable to increase the reaction rate, then as much as 3 percent or even more of the initiator may be used.

If desired, the unreacted monomers may be separated from the grafted product by any conventional technique known in the art, such as by distillation, solvent extraction, or selective solvent fractionation.

The organopolysiloxanes described heretofore may be cross-linked with polyalkoxysilanes of the formula:

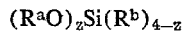

or polyalkoxysiloxanes in which the silicon atoms are linked through Si—O—Si bonds, and the remaining valences of the silicon atom are satisfied by $R^aO$ and/ or $R^b$.

In the above formula, groups represented by $R^a$ are monovalent hydrocarbon radicals having less than 8 carbon atoms, while those represented by $R^b$ are monovalent hydrocarbon radicals or halogenated hydrocarbon radicals of less than 8 carbon atoms, and $z$ has a value of from 3 to 4. Examples of monovalent hydrocarbon radicals represented by $R^a$ are methyl, propyl, butyl, hexyl, octyl, phenyl, vinyl, allyl, ethylallyl, butadienyl, and the like. The radicals represented by $R^b$ may be the same as the radicals represented by $R^a$, as well as the corresponding halogenated groups, such as chloromethyl, 2-bromo-4,6-diiodophenyl, 1,2-difluorovinyl, 3,4-difluorocyclopentyl, 2-bromocyclopentene-2,3-yl, and 6-chlorohexyl. The polyalkoxysilanes employed herein include monoorganotrihydrocarbonoxysilanes, tetrahydrocarbonoxysilanes, e.g., orthosilicates and partial hydrolyzates of such silanes. The polyalkoxy compounds, e.g., ethyl orthosilicate or partially hydrolyzed ethyl silicate, such as ethyl silicate "40" which consists primarily of decaethyl tetrasilicate, are representative of these compounds. Examples of other operative alkylsilicates are ethyltrimethoxysilane, methylbutoxydiethoxysilane, propyltripropoxysilane, methyltriethoxysilane, ethyltriethoxysilane, ethyl orthosilicate, and butyl orthosilicate. Examples of alkylpolysilicates are ethylpolysilicate, isopropylpolysilicate, butylpolysilicate, dimethyltetraethoxydisiloxane, trimethylpentabutoxydisiloxane, and the like.

The polyalkoxysilanes and polyalkoxysiloxanes employed herein may be used either alone or in combination. They should be used in a proportion of from about 0.5 to about 10 percent, preferably from about 1 to 6 percent by weight based on the weight of the organopolysiloxane. If the total weight of the polyalkoxysilanes or polyalkoxysiloxanes is below about 0.5 percent based on the weight of the organopolysiloxane, very little cross-linking occurs.

The curing of these organopolysiloxane compositions is brought about by mixing the hydroyl-terminated organopolysiloxanes with polyalkoxysilane or polyalkoxysiloxane cross-linking agents in the presence of the hydroxylamino catalysts of this invention. These catalysts may be dispersed in an inert solvent and then added to the organic polysiloxane composition, or they may be dispersed on a filler and thereafter milled with organopolysiloxane. Examples of suitable hydrocarbon solvents are benzene, toluene, xylene, and the like; halogenated hydrocarbons, such as perchloroethylene or chlorobenzene; organic ethers, such as dibutyl ether and the like or fluid hydroxyl-free polysiloxanes. It is preferred that the solvents be of sufficient volatility to vaporize off at a very low temperature.

The hydroxylamines used in the curing of these organopolysiloxanes are effective in minimal amounts, e.g., from about .01 to about 10 percent, preferably from about 0.1 to about 1 percent by weight based on the weight of the composition. A mixture of two or more of the above hydroxylamines may be used as catalysts in order to provide variable curing times. As mentioned previously, these hydroxylamine catalysts may be added to the organopolysiloxane or, for convenience, they may be first incorporated in a carrier, such as a liquid or comminuted solid, or they may be added to both solid and liquid components. Generally, the carrier is inert but in some cases it may be functional.

The amount of catalyst used is determined primarily by the requirements of the particular job, especially the pot life or working time required. In general, from about 0.1 to 1.0 percent by weight based on the composition will provide a satisfactory cure and also provide sufficient working time.

Although it is not essential, oftentimes it is desirable to incorporate fillers in these compositions in order to impart desirable physical properties. Examples of suitable fillers are fumed silicas, high surface-area-precipated silicas, silica aerogels, as well as coarser silicas, such as diatomaceous earth, crushed quartz, and the like. Other fillers which may be used are metallic oxides, such as

EXAMPLE 5

(a) To about 10 parts of the modified organopolysiloxane prepared in accordance with the procedure described in Example 4(f) are added about 0.5 part of pure ethyl silicate and about 0.4 part of diethyl hydroxylamine. The reactants are mixed, placed in a mold and cured at room temperature.

(b) The above example is repeated except that ethyl silicate "40" is substituted for the pure ethyl silicate.

The cure times are illustrated in Table III.

EXAMPLES 6–14

In accordance with the procedure described in Example 1, modified organosiloxanes prepared in accordance with Example 4 are mixed with ethyl silicate "40" and various catalysts and cured in ambient moisture at room temperature. The curing times of these examples are illustrated in Table III.

TABLE III

| Example number | OH-polysiloxane Ex. No. | Parts | Cross-linking agent Type | Parts | Filler,[1] parts | Catalyst[2] Parts | R | R' | Tack free time hr. | Complete cure hr. |
|---|---|---|---|---|---|---|---|---|---|---|
| 5(a) | 4(f) | 10 | ES | 0.5 |  | 0.4 | $C_2H_5$ | $C_2H_5$ |  | 48.0 |
| 5(b) | 4(f) | 10 | ES "40" | 0.5 |  | 0.4 | $C_2H_5$ | $C_2H_5$ | 0.15 | 1.6 |
| 6 | 4(a) | 10 | ES "40" | 0.6 |  | 1.0 | $CH_3$ | $CH_3$ | 0.13 | 1.5 |
| 7 | 4(a) | 10 | ES "40" | 0.6 |  | 1.0 | $C_4H_9$ | $C_4H_9$ | 1.3 | 3.0 |
| 8 | 4(a) | 10 | ES "40" | 0.6 |  | 1.0 | $C_8H_{17}$ | $C_8H_{17}$ | 4.1 | 8.0 |
| 9 | 4(b) | 10 | ES "40" | 0.6 |  | 1.0 | $C_6H_5$ | $C_6H_5$ | 5.3 | 12.0 |
| 10 | 4(c) | 10 | ES "40" | 0.6 |  | 1.0 | $CH_3$ | $C_2H_5$ | 0.15 | 1.5 |
| 11 | 4(d) | 10 | ES "40" | 0.6 |  | 1.0 | $CH_3$ | $C_6H_5$ | 3.1 | 6.0 |
| 12 | 4(e) | 10 | ES "40" | 0.6 |  | 1.0 | $C_4H_{10}$ | $C_2H_5$ | 0.8 | 2.5 |
| 13 | 4(g) | 10 | ES "40" | 0.6 |  | 1.0 | $C_8H_{17}$ | $CH_3$ | 3.6 | 8.0 |
| 14 | 4(f) | 10 | ES "40" | 0.6 | 7.5 | 1.0 | $C_2H_5$ | $C_2H_5$ | 0.1 | 1.0 |

[1] 1.5 parts zinc oxide: 6.5 parts MINUSIL (5 microns).

[2] 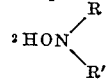

NOTE.—PMS=polydimethylsiloxane; ES "40"=ethyl silicate "40"; ES=ethyl silicate (pure).

EXAMPLE 15

To about 10 parts of a hydroxyl-terminated polydimethylsiloxane (4000 cs.) are added about 0.6 part of ethyl silicate "40" and about 0.2 part of diethyl hydroxylamine. The reactants are mixed, placed in a mold and cured at room temperature under anhydrous conditions. The material cured to a tack-gree condition in 0.2 hour and completely cured in 2.0 hours.

When the above example was repeated, except the molded material was cured in the presence of atmospheric moisture, substantially the same results were obtained.

When the above examples are repeated utilizing other hydroxylamine catalysts and fillers, elastomeric materials are obtained which have properties substantially equivalent to those specified in the examples.

Although specific examples have been described herein other variations and modifications falling within the spirit and scope of the appended claims are to be included therein.

The invention claimed is:

1. A composition curable at room temperature consisting essentially of an organopolysiloxane selected from the group consisting of

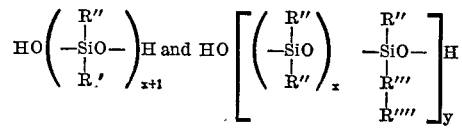

in which R" is selected from the group consisting of monovalent hydrocarbon radicals, halogenated monovalent hydrocarbon radicals and cyanoalkyl radicals, R''' is a divalent hydrocarbon radical, R'''' is a polymeric group connected to R''' by a carbon-to-carbon linkage, said polymeric group is derived from at least one olefinic compound selected from the group consisting of unsaturated aliphatic hydrocarbons, unsaturated halogenated hydrocarbons, vinyl aromatic compounds, unsaturated acids and acid anhydrides, unusaturated esters, unsaturated amides and unsaturated nitriles, $x$ is an integer of from 0 to 20,000 and $y$ is an integer of from 1 to 500, a cross-linking agent selected from the group consisting of polyalkoxysilanes of the formula:

$$(R^aO)_zSi(R^b)_{4-z}$$

and polyalkoxysiloxanes in which the silicon atoms are linked through Si—O—Si bonds and the remaining valences are satisfied by $R^aO$ and $R^b$ groups, said cross-linking agent is present in an amount of at least 0.5 percent by weight based on the weight of the organopolysiloxane and at least 0.01 percent by weight based on the weight of the composition of a catalyst of the formula:

in which R and R' are hydrocarbon groups having up to 12 carbon atoms, $R^a$ is a monovalent hydrocarbon radical having less than 8 carbon atoms and $R^b$ is selected from the group consisting of monovalent hydrocarbon radicals and halogenated monovalent hydrocarbon radicals having less than 8 carbon atoms and $z$ has a value of 3 to 4.

2. The composition of claim 1 wherein R and R' are alkyl radicals.

3. The composition of claim 1 wherein the catalyst is diethyl hydroxylamine.

4. The composition of claim 1 wherein R and R' are aryl radicals.

5. The composition of claim 1 wherein the cross-linking agent is ethyl orthosilicate.

6. The composition of claim 1 wherein the catalyst is present in an amount of from 0.01 to about 10 percent by weight based on the weight of the composition.

7. A method for preparing an elastomeric silicone rubber which comprises mixing an organopolysiloxane selected from the group consisting of

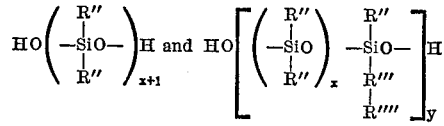

in which R" is selected from the group consisting of monovalent hydrocarbon radicals, halogenated monovalent hydrocarbon radicals and cyanolakyl radicals, R''' is a divalent hydrocarbon radical, R'''' is a polymeric group connected to R''' by a carbon-to-carbon linkage, said polymeric group is derived from at least one olefinic compound selected from the group consisting of unsaturated aliphatic hydrocarbons, unsaturated halogenated hydrocarbons, vinyl aromatic compounds, unsaturated acids and acid anhydrides, unsaturated esters, unsaturated amides and unsaturated nitriles, $x$ is an integer of from 0 to 20,000 and $y$ is an integer of from 1 to 500, a cross-linking titanium oxide, ferric oxide, zinc oxide, and fibrous fillers, such as asbestos, fibrous glass, and the like. Other additives, such as pigments, antioxidants, ultraviolet absorbents, and the like, may be included in these compositions.

Even though the particle size of the filler and additive is not critical, it is preferred that they range from about 0.1 millimicrons up to about 2 millimicrons in diameter. Particles of larger diameter may be used; however, they may be more difficult to incorporate in the composition.

The organopolysiloxanes may be compounded in the usual manner for preparing conventional siloxane elastomers; however, where the materials are stored prior to use, it is essential that the hydroxylamine catalysts or cross-linking agents, such as polyalkoxysilane or polyalkoxysiloxane, be stored separately. In other words, the hydroxyl-terminated polysiloxanes, filler, and cross-linking agent may be compounded and the amino catalyst added just prior to use. In another method, the polysiloxane, filler, and catalyst may be compounded and then the cross-linking agent added just prior to use. If an inert filler is used, it may be added either to the hydroxyl-terminated organopolysiloxane or the cross-linking agent prior to the addition of the catalyst or immediately after the reactants have been combined.

The hydroxylamine catalysts of this invention will produce a tack-free surface ranging from a few minutes up to several hours, depending upon the type and concentration of catalyst. In addition, mixtures of the catalysts containing various organic substituents will accelerate the curing time of the entire exposed section. Thus, a complete cure which generally takes from 3 to 7 days without a hydroxylamine may be effected in as little as about 1 to 2 hours with the catalyst described herein when applied in the proper concentrations. The use of these catalysts in two-component systems, such as described above, is as previously noted without precedent in the art.

dimethylsiloxane are added about 0.6 part of ethyl silicate "40" and about 0.2 part of diethyl hydroxylamine. The reactants are mixed, placed in a mold and cured at room temperature.

(b) In a similar experiment, about .003 part of diethyl hydroxylamine and about 7.5 parts of a filler (1.5 parts of zinc oxide per 6.5 parts of Minusil) are mixed with the polydimethylsiloxane and ethyl silicate "40," placed in a mold and cured at room temperature.

(c) Examples 1(b) above is repeated except .005 part of diethyl hydroxylamine is added to the polydimethylsiloxane, ethyl silicate "40," and the filler.

The results of the above experiments are illustrated in Table 1.

EXAMPLE 2

(a) To about 10 parts of hydroxy-terminated organopolysiloxane are added about 0.6 part of pure ethyl silicate and 1.0 parts of diethyl hydroxylamine. The reactants are mixed, placed in a mold and cured at room temperature.

(b) Example 2(a) above is repeated except that 2.0 parts of diethyl hydroxylamine is added as catalyst and the product cured at room temperature.

The results of these experiments are illustrated in Table I.

EXAMPLE 3

(a) To about 10 parts of hydroxyl-terminated organopolysiloxane (10,000 cs.) are added about 0.6 part of ethyl silicate "40" and about 0.1 part of diethyl hydroxylamine. The reactants are mixed, placed in a mold and cured at room temperature.

(b) The above example is repeated except that 1.0 parts of butylmethyl hydroxylamine is used and the product cured at room temperature.

The results of these two examples are illustrated in Table I.

TABLE I

| Example number | OH-polysiloxane | | Cross-linking agent | | Filler,[1] parts | Catalyst [2] | | | Tack free time, hr. | Complete cure, hr. |
|---|---|---|---|---|---|---|---|---|---|---|
| | Type | Parts | Type | Parts | | Parts | R | R' | | |
| 1(a) | PMS (4,000 cs.) | 10 | ES "40" | 0.6 | | 0.2 | $C_2H_5$ | $C_2H_5$ | 0.2 | 1–2 |
| 1(b) | PMS (4,000 cs.) | 10 | ES "40" | 0.6 | 7.5 | .003 | $C_2H_5$ | $C_2H_5$ | 4.0 | 24 |
| 1(c) | PMS (4,000 cs.) | 10 | ES "40" | 0.6 | 7.5 | .005 | $C_2H_5$ | $C_2H_5$ | 4.0 | 24 |
| 2(a) | PMS (4,000 cs.) | 10 | ES | 0.6 | | 1.0 | $C_2H_5$ | $C_2H_5$ | 48.0 | 48 |
| 2(b) | PMS (4,000 cs.) | 10 | ES | 0.6 | | 2.0 | $C_2H_5$ | $C_2H_5$ | 10.0 | 24 |
| 3(a) | PMS (10,000 cs.) | 10 | ES "40" | 0.6 | | 0.1 | $C_2H_5$ | $C_2H_5$ | 1.0 | 8 |
| 3(b) | PMS (4,000 cs.) | 10 | ES "40" | 0.6 | | 1.0 | $C_4H_9$ | $CH_3$ | 0.2 | 2 |

[1] 1.5 parts zinc oxide: 6.5 parts Minusil (5 microns).

[2] 

NOTE.—PMS=polydimethylsiloxane; ES "40"=ethyl silicate "40"; ES=ethyl silicate (pure).

The catalysts described herein may be used in room temperature vulcanizing compositions to produce variable curing times. These compositions may be used as sealants between adjacent sections of highway, insulation material for electrical components, gaskets, and the like.

Various embodiments of this invention are further illustrated in the following examples in which all parts are by weight unless otherwise specified.

EXAMPLE 1

(a) To about 10 parts of a hydroxyl-terminated poly-

EXAMPLE 4

Modified organopolysiloxanes are prepared by reacting olefinic compounds with hydroxyl-terminated polydimethylsiloxanes in the presence of a free-radical initiator at a temperature of from about 60° to 190° C. The unreacted olefinic compounds are removed at an elevated temperature by applying a vacuum of 1 mm. Hg or less while continuing to agitate for an additional hour. The pertinent data is illustrated in Table II.

TABLE II

| Example number | Olefinic compound | | Hydroxylated fluid | | Free-radical initiator | | Reaction conditions | | final polymer viscosity, cs. |
|---|---|---|---|---|---|---|---|---|---|
| | Type | Parts | Viscosity, cs. | Parts | Type | Parts | Temp., ° C. | Time hr. | |
| 4(a) | Acrylonitrile / Butyl acrylate | 14.6 / 35.4 | 1,900 | 50 | t-BP | 0.5 | 80 | 1.5 | 14,000 |
| 4(b) | Acrylonitrile / Butyl acrylate | 9.0 / 51.0 | 800 | 40 | t-BP | 0.5 | 80 | 1.7 | 7,800 |
| 4(c) | Acrylonitrile / Ethyl acrylate / Butyl acrylate | 9.1 / 2.9 / 48.0 | 800 | 40 | t-BP | 0.25 | 80 | 2.0 | 20,200 |
| 4(d) | Methylacrylate | 50.0 | 400 | 50 | t-BP | 0.5 | 80 | 4.0 | 15,500 |
| 4(e) | Lauryl methacrylate | 70.0 | 400 | 30 | t-BP | 0.5 | 80 | 5.0 | 19,400 |
| 4(f) | Styrene / Butyl acrylate | 250.0 / 204.0 | 610 | 304 | t-BP | 2.0 | 125 | 24.0 | 14,500 |
| 4(g) | Vinyl chloride | 45.0 | 6,700 | 350 | t-BPer | 1.8 | 80 | 4.0 | 17,800 |

NOTE.—t-BP=t-butyl peroxide; t-BPer=t-butyl peroctoate.

agent selected from the group consisting of polyalkoxysilanes of the formula:

$$(R^aO)_zSi(R^b)_{4-z}$$

and polyalkoxysiloxanes in which the silicon atoms are linked through Si—O—Si bonds and the remaining valences are satisfied by $R^aO$ and $R^b$ groups, said cross-linking agent is present in an amount of at least 0.5 percent by weight based on the weight of the organopolysiloxane and at least 0.01 percent by weight based on the weight of the composition of a catalyst of the formula:

in which R and R' are hydrocarbon groups having up to 12 carbon atoms, $R^a$ is a monovalent hydrocarbon radical having less than 8 carbon atoms and $R^b$ is selected from the group consisting of monovalent hydrocarbon radicals and halogenated monovalent hydrocarbon radicals having less than 8 carbon atoms and z has a value of 3 to 4.

References Cited
UNITED STATES PATENTS

| | | | |
|---|---|---|---|
| 3,127,363 | 3/1964 | Nitzsche et al. | 260—46.5 G |
| 3,560,244 | 2/1971 | Neuroth | 260—46.5 G |
| 3,527,728 | 9/1970 | Gibbon et al. | 260—46.5 G |

DONALD E. CZAJA, Primary Examiner

M. I. MARQUIS, Assistant Examiner

U.S. Cl. X.R.

260—37 SB, 46.5 G, 825